United States Patent Office 3,704,327
Patented Nov. 28, 1972

---

3,704,327
ALKYLIDENEDITHIO-BISPHENOLS
Martin B. Neuworth, Trumbull, Conn., assignor to Continental Oil Company, Ponca City, Okla.
No Drawing. Continuation-in-part of application Ser. No. 835,811, June 23, 1969, which is a continuation-in-part of applications Ser. No. 637,622, Ser. No. 637,649, and Ser. No. 637,650, all May 11, 1967, all now abandoned. This application Dec. 10, 1971, Ser. No. 206,930
Int. Cl. C07c 149/18
U.S. Cl. 260—609 F          2 Claims

ABSTRACT OF THE DISCLOSURE

Alkylidenedithiobisphenols having the general formula:

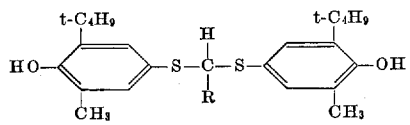

where R is hydrogen or methyl. The compounds are useful as rubber antioxidants.

---

CROSS-REFERENCE TO RELATED APPLICATION

This is a continuation-in-part Ser. No. 835,811, filed June 23, 1969, now abandoned, which was itself a continuation-in-part of patent applications, Ser. Nos. 637,-622; 637,649; and 637,650, all filed May 11, 1967 and all now abandoned.

BACKGROUND OF THE INVENTION

Field of the invention

This invention relates to sulfur-containing bisphenols useful as rubber antioxidants.

Description of the prior art

United States Patents Nos. 2,278,224 and 2,472,318 describe compounds defined by the formula DR$x$R'$x$RD, in which R is an aryl or alkyl aryl, or a substituted aryl or alkyl aryl group, $x$ is a sulfur, oxygen or tellurium, but preferably a sulfur group, R' is an alkyl or substituted alkyl group, and D is an inhibitor group taken from the class of hydroxy, amino, sulfide, disulfide or polysulfide groups.

SUMMARY OF THE INVENTION

The novel chemical compounds of the present invention are especially useful as rubber antioxidants. They have the following general formula:

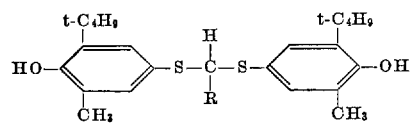

where R is selected from the class consisting of hydrogen and methyl groups.

The compounds of the present invention are prepared as follows. The appropriate 4-mercaptophenol is reacted with the appropriate carbonyl compound in the presence of a strong acid catalyst, according to the following equation:

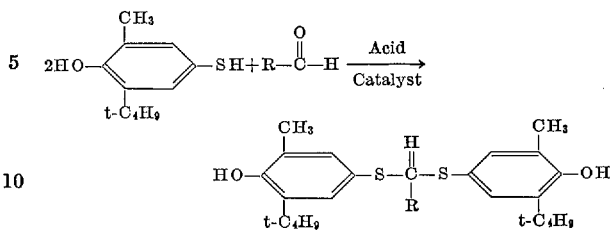

where R is H or CH$_3$. The appropriate 4-mercaptophenol may be prepared by any one of several known methods. For example, thiocyanation of the appropriate phenol, followed by reduction, is one of such methods. For details, see Organic Reactions, vol. III, Chapter 6, by Roger Adams et al.; also the article by Müeller et al., entitled "Untersuchungen an schwefelhaltigen Aroylen mittels der Electronenresonanz" in Liebig's Annalen (1961, Bd. 645, p. 79); and, finally, U.S. Patent 3,129,262.

The mercaptophenol and the appropriate carbonyl compound are preferably dissolved in an inert organic solvent to provide a homogeneous reaction mixture. At least a stoichiometric amount of the carbonyl compound is used. The catalyst is a strong acid catalyst, for example hydrochloric acid, sulfuric acid, perchloric acid, and strong acid cationic exchange resins. The reaction is mildly exothermic initially; external heating is then required to maintain the reaction temperature, generally between 50 and 100° C. Reaction times of 0.8 to 6 hours are generally required.

The following examples illustrate the compound of this invention. In each example, the chemical name and structural formula of the compound are first given. The identity of the compound produced in each example was established by conventional methods of analysis.

EXAMPLE 1

Preparation of: Bis-(3-t-butyl-5-methyl-4-hydroxy-phenylmercapto)-methane

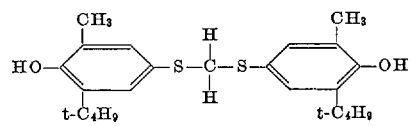

4-mercapto-6-t-butyl-o-cresol (39.3 grams, 0.2 mole) was dissolved in 50 milliliters of methanol at room temperature, and 1 milliliter of concentrated HCl was added. Then, 37% formaldehyde (8.1 grams, 0.1 mole) in aqueous solution was added over five minutes with a resultant temperature rise from 29° C. to 35° C. Stirring of the homogeneous solution was continued for 40 minutes, at which time, 9.5 milliliters of 10% NaHCO$_3$ solution was added to neutralize the HCl. The mixture was then extracted with 200 milliliters of ethyl ether. The ether extract was extracted with three 30-milliliter portions of 10% NaOH in aqueous solution to remove unreacted mercaptophenols. The caustic extract was discarded. The ether layer was water washed to pH 7, dried, filtered and evaporated to a dry tan powder which was recrystallized from hexane. A nearly colorless crystalline product was obtained which had a melting point of 121°–123.5° C. When recrystallized from isopropyl alcohol and dried

EXAMPLE 2

Preparation of: 1,1-bis-(3-t-butyl-5-methyl-4-hydroxyphenylmercapto)-ethane

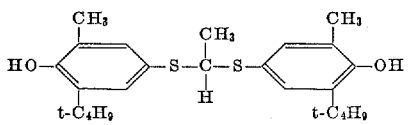

4 - mercapto - 6 - t-butyl-o-cresol (196.5 grams, 1.0 mole) was dissolved in 150 milliliters of methanol, and 5.0 milliliters of concentrated HCl was added. Then, acetaldehyde (22.0 grams, 0.5 mole) was added with a resultant temperature rise from room temperature to 32° C. External heating was employed to maintain reflux temperature (72° C.) for 6 hours. To the slightly cooled solution (65° C.) was added 5 grams of solid sodium bicarbonate to neutralize the HCl. The precipitated NaCl was removed by filtration and the filtrate allowed to cool slowly to precipitate the desired mercaptal. Filtration yielded as a first crop of the desired product, 156 grams of a white powder, melting point 123°–124° C. The filtrate was evaporated to a waxy solid, which was dissolved in ether and extracted with 10% NaOH solution. Acidification of the caustic extract yielded about 5 grams of a cloudy oil which was presumed to be unreacted mercaptobutylcresol. The caustic insolubles in the ether were water washed and the ether solution dried over magnesium sulfate and evaporated, finally at 100° C./20 mm. Hg, to yield 39 grams of a waxy or oily solid. Trituration of this product with 50 milliliters hexane yielded 31 grams of a very light crystalline material, melting point 121°–122.5° C., as a second crop of the desired product. The yield of total product was 95 percent.

The compounds of this invention are especially useful as antioxidants for rubbers. The rubbers which are stabilized against deterioration by oxygen by compounds of this invention are the natural and synthetic rubbers which have high olefinic unsaturation. Such synthetic rubbers are the homopolymers of aliphatic conjugated diolefin hydrocarbons and copolymers of such diolefins with mono-olefin compounds copolymerizable therewith. Such mono-olefins include styrene; alpha-methyl-styrene; p-methylstyrene; alpha, p-dimethylstyrene; acrylic and methacrylic nitriles, amides, acids and esters; vinyl pyridines; fumaric esters; methylenemalonic esters; vinylidene chloride, methyl vinyl ketone; and methyl isopropenyl ketone. Mixtures of such mono-olefinic compounds can also be copolymerized with the diolefin. The term "high olefinic unsaturation" means an amount of unsaturation on the order of that occurring in Hevea rubber. The copolymers must contain copolymerized therein at least about 35 percent of the diolefin hydrocarbon.

The synthetic rubbers referred to may be either emulsion polymers or stereospecific (or stereoregular) homopolymers and copolymers of aliphatic conjugated diolefin hydrocarbons, of which the polymers of greatest commercial interest now are cis-1,4 - polyisoprene (often called synthetic natural rubber) and cis-1,4-polybutadiene.

The compounds of the present invention may be incorporated into the selected rubber in the conventional way. An amount of the order of one-half percent of the compound is generally sufficient to provide stabilization.

Table I below tabulates the results obtained by the direct use of compounds of this invention as antioxidants for rubber. In addition, the results obtained on a blank and a commercial rubber antioxidant are included for comparison. In each case, a sample of the compound was incorporated in a natural rubber of the following composition:

| Component | Parts by weight |
|---|---|
| Pale crepe rubber | 100.00 |
| Zinc oxide | 50.00 |
| Titanium oxide | 25.00 |
| Stearic acid | 2.00 |
| Ultramarine blue | 1.00 |
| Mercaptobenzothiazole | 1.00 |
| Sulfur | 3.00 |

One part by weight of the selected compound was added to the above mixture to provide a batch. A series of samples containing the selected antioxidant was prepared from the batch. A second series of samples was also prepared which contained no antioxidant, to serve as blanks. All the samples were first cured, their tensile strength determined, and then they were subjected to oxygen bomb (ASTM D–572–53). Their tensile strength after the aging treatment was measured. The results obtained are shown in Table I below.

TABLE I

| Composition | Oxygen bomb aging | |
|---|---|---|
| | Aged tensile | Percent of original tensile |
| Blank | 1,640 | 53.0 |
| (Example 1) | 2,120 | 71.3 |
| (Example 2) | 2,195 | 74.0 |
| (Commercial antioxidant) | 2,265 | 78.5 |

According to the provisions of the patent statutes, I have explained the principle, preferred construction and mode of operation of my invention and have illustrated and described what I now consider to represent its best embodiment. However, I desire to have it understood that, within the scope of the appended claims, the invention may be practiced otherwise than as specifically illustrated.

I claim:
1. Bis - (3 - t-butyl - 5 - methyl - 4 - hydroxyphenylmercapto)-methane.
2. 1,1 - bis - (3 - t-butyl - 5 - methyl - 4 - hydroxyphenylmercapto)-ethane.

References Cited

UNITED STATES PATENTS 3,489,804   1/1970   O'Shea _____ 260—609 F

LEWIS GOTTS, Primary Examiner

D. R. PHILLIPS, Assistant Examiner

U.S. Cl. X.R.

260—45–95, 799; 252—404